July 29, 1969  H. B. DURHAM  3,457,828
HOLDER FOR MACHINING IMPACT SPECIMENS
Filed Oct. 16, 1967  2 Sheets-Sheet 1

INVENTOR.
HARRY B. DURHAM
BY
ATTORNEY

July 29, 1969  H. B. DURHAM  3,457,828
HOLDER FOR MACHINING IMPACT SPECIMENS
Filed Oct. 16, 1967  2 Sheets-Sheet 2

INVENTOR.
HARRY B. DURHAM
BY Donald G. Dalton
ATTORNEY 3,457,828
HOLDER FOR MACHINING IMPACT SPECIMENS
Harry B. Durham, Mount Lebanon Township, Allegheny
County, Pa., assignor to United States Steel Corporation,
a corporation of Delaware
Filed Oct. 16, 1967, Ser. No. 675,672
Int. Cl. B23c 1/00, 3/00, 7/00
U.S. Cl. 90—11                                    4 Claims

ABSTRACT OF THE DISCLOSURE

A fixture for holding a metal workpiece, such as a Charpy test specimen, during a machining operation such as the milling of a notch. The fixture includes two clamping means for holding the workpiece from lengthwise, vertical, and lateral movements.

---

This invention relates to a fixture for holding a metal workpiece while it is being machined. The fixture is particularly well suited for holding a Charpy test specimen while a notch is cut in the specimen by a milling cutter.

Charpy test specimens are used to test the ability of a metal to absorb energy when struck by a sharp blow at a point of great stress concentration. To provide this stress concentration, a notch is milled in the Charpy specimen. Close tolerances are required in milling this notch, both as to the depth of the notch and as to the location of the notch in the specimen. To obtain these tolerances, the fixture which supports the Charpy specimen must hold the specimen firmly against the slightest movement in any direction. Also, for the sake of production efficiency, the fixture must be one wherein the specimens can be secured and released quickly and with a minimum of hand motion on the part of the milling machine operator.

It is therefore an object of my invention to provide an improved fixture for holding Charpy specimens or other metal workpieces which will fill both of the foregoing requirements to a greater degree than has been achieved with previously known fixtures.

This and other objects will be apparent from the following detailed description of my invention and the attached drawings, in which.

Figure 1:
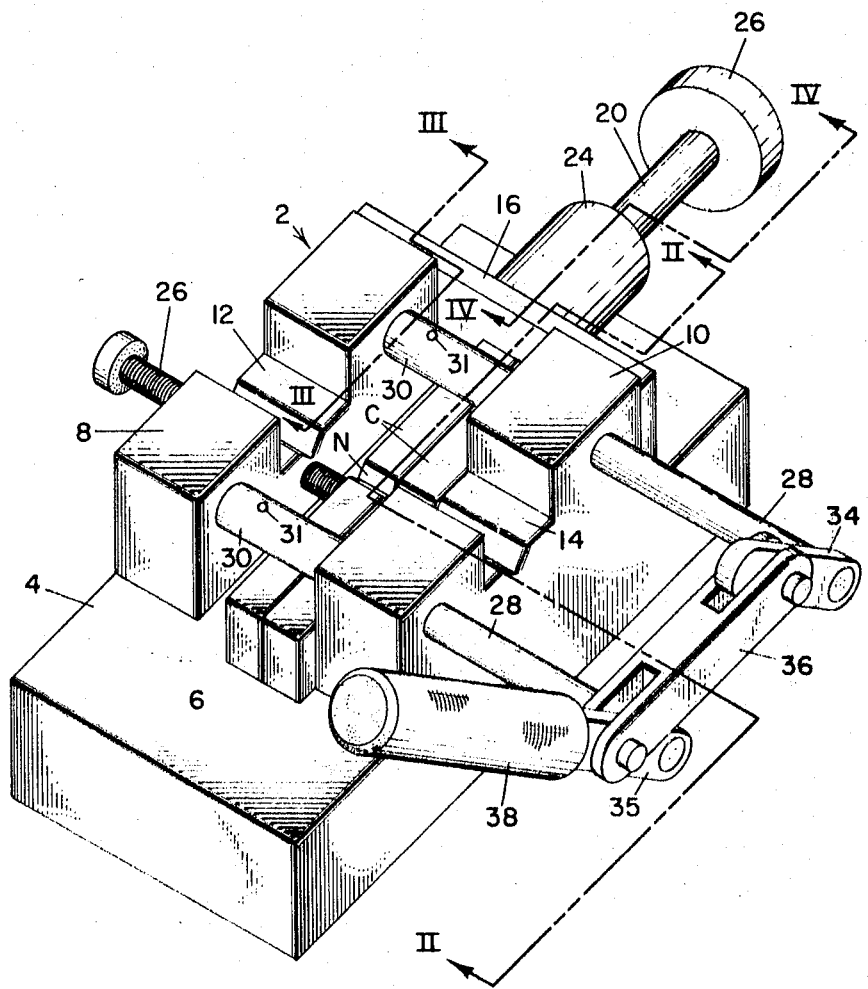
FIGURE 1 is a perspective view of a fixture for holding a Charpy test specimen during the machining of a groove therein.

Referring to FIGURE 1, the fixture 2 includes a base 4 with a workpiece supporting surface 6 on which are placed Charpy test specimens C. Integral with the base 4 are block portions 8 and 10 having cut out areas 12 and 14 respectively. As may be seen in FIGURE 2, these cut out areas permit passage of a milling cutter M during the cutting of notches N in Charpy specimens C.

Figure 3:
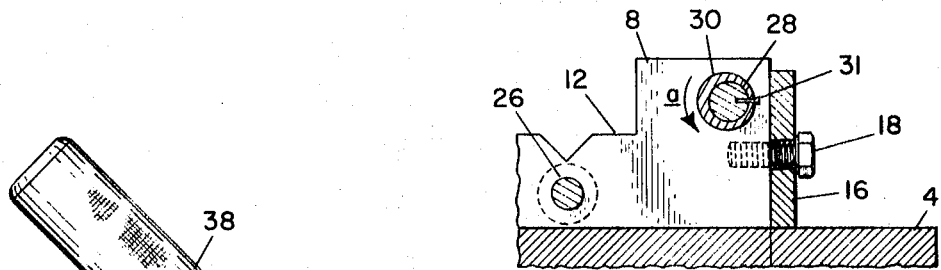
FIGURE 3 is a partial sectional elevation of the fixture of FIGURE 1, taken along line III—III of FIGURE 1.
Figure 4:
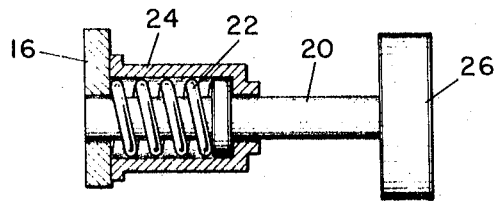
FIGURE 4 is a partial section of the fixture of FIGURE 1, taken along line IV—IV of FIGURE 1.

At one end of the fixture 2, a stop plate 16 is fastened to block portions 8 and 10 by screws 18 (FIGURE 3). The ends of Charpy specimens C are placed against this stop plate 16. On the opposite side of the plate 16 from the Charpy specimens is mounted an ejector pin 20 (FIGURES 1 and 4), which is held in its retracted position by an ejector spring 22 (FIGURE 4) inside a spring housing 24. The ejector pin 20 is operated by pushing quickly on knob 26 against the force of spring 22, thereby forcing the end of the pin 20 against the Chapry specimens C and causing the specimens C to slide out of the other end of fixture 2.

During the milling of notches N, the Charpy specimens C are firmly held from lengthwise, vertical, and lateral movements by two easily operated clamping means. The first clamping means is a screw 26 (FIGURE 1) which is threaded through a tapped hole in block portion 8. When the screw 26 is advanced through the hole in block portion 8, it engages a wall of one of the Charpy specimens C directly beneath where the notch N is to be milled. The screw 26 is tightened against Charpy specimen C until the specimens are held firmly against the inner wall of block portion 10.

Figure 2:
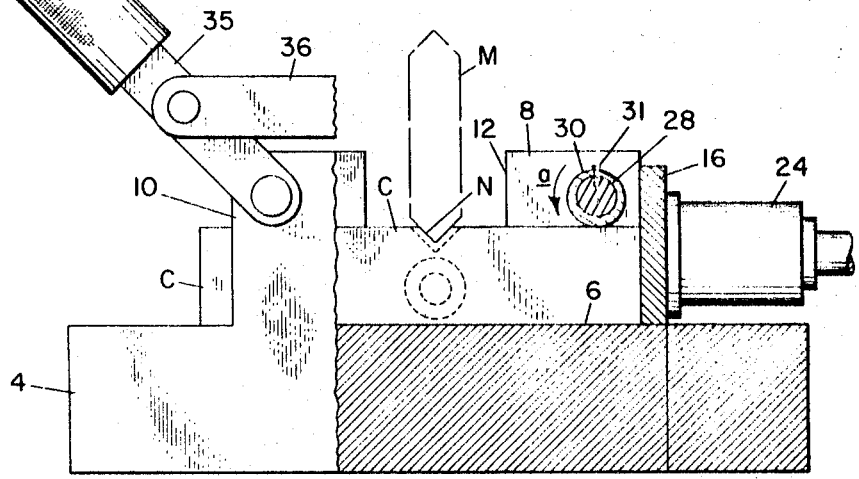
FIGURE 2 is a sectional elevation of the fixture of FIGURE 1, taken along line II—II of FIGURE 1.

The other clamping means comprises a pair of shafts 28 (FIGURE 1), each rotatably supported in holes in the block portions 8 and 10. Between these block portions, camming sleeves 30 are secured to the shafts 28 by pins 31. As seen in the cross sectional views of FIGURES 2 and 3, the outer surfaces of the camming sleeves 30 not concentric with the shafts 28. The elevation of the shafts 28 is such that when the portions of the camming sleeves 30 farthest from the axes of shaft 28 are facing downward, as shown in FIGURE 2, they engage the top surfaces of the Charpy specimens C and hold these specimens tight against the workpiece supporting surface 6 of base 4. Thus, when the shafts 28 are rotated counterclockwise from their unclamped positions shown in FIGURE 3 (arrow $a$) to their positions shown in FIGURE 2, the camming sleeves 30 clamp down on the top surfaces of Charpy specimens C. Also, due to the frictional force exerted by the camming sleeves 30 on the specimens C, the specimens are tightened against the vertical stop plate 16 (FIGURE 2).

In order to turn the shafts 28 simultaneously, links 34 and 35 (FIGURE 1) are mounted on the ends of the shaft 28 and these links are connected by a cross link 36. A handle 38 mounted on link 35 enables the operator to turn both shafts 28 with one motion.

In operation, the operator clamps the base 4 of fixture 2 to the operating table of a milling machine. He then slides as many Charpy specimens C as he desires to cut at one time between the block portions 8 and 10, and clamps them laterally against the inner face of block portion 10 by advancing the screw 26. By pulling on handle 38, the operator turns the shafts 28 counterclockwise, as viewed in FIGURES 2 and 3 (arrows $a$). The handle 38 is pulled until the camming sleeves 30 engage the top surfaces of the Charpy specimens C and tighten them downwardly against the supporting surface 6 of base 4 and longitudinally against the stop plate 16. With the Charpy specimens C thus firmly fixed, the milling cutter M (FIGURE 2) is positioned to align it with marks previously scribed on the specimens C.

After the milling operation has been completed, the handle 38 is pushed so as to disengage the camming sleeves 30 from the Charpy specimens C, and the screw 26 is retracted to free the specimens C laterally. The operator then strikes the knob 26 with a sharp blow, causing the ejector pin 20 to push the Charpy specimens C out from between the block portions 8 and 10.

It can thus be seen that with my invention, workpieces may be securely held from movement in all directions while they are being machined, yet they may be locked in and released from their supporting fixture by a quick and easy procedure that improves production efficiency.

While I have shown and described one embodiment of my invention, it will be apparent that other adoptations and modifications may be made within the scope of the appended claims.

I claim:
1. A fixture for holding a metal workpiece during a transverse cut on said workpiece by a cutting tool, comprising a base having a workpiece supporting surface substantially parallel to the direction of travel of said cutting tool, a first stop means on said base for limiting the lateral movement of said workpiece over said supporting surface in a direction parallel to the travel of said cutting tool, means for holding said workpiece against said first stop means, a shaft rotatably mounted on said base on an axis parallel with the travel of said cutting tool and being located on the opposite side of said workpiece from said supporting surface, eccentric cam means mounted on said shaft, and positioned so that when said shaft is rotated, said cam means will engage said workpiece and tighten said workpiece against said supporting surface, and means for rotating said shaft.

2. The fixture of claim 1 in which there is included a second stop means on said base for limiting the lateral movement of said workpiece over said supporting surface in a direction perpendicular to the travel of said cutting tool, and said cam means exerts, when bearing against said workpiece a frictional force tending to hold said workpiece firmly against said second stop means.

3. The fixture of claim 1 wherein there are two of said shafts and said cam means for tightening said workpiece against said supporting surface, and said means for rotating said shafts includes a link fixed to each of said shafts, a cross link having each end rotatably connected to each of said links so that said links and connected shafts rotate together, and means for rotating one of said links so as to rotate said shafts together.

4. The fixture of claim 1 in which said means for holding said workpiece against said first stop means includes a screw support means on said base on the opposite side of said workpiece supporting means from said first stop means, said screw support means having a tapped hole with an axis parallel to the travel of said cutting tool, and a screw threadably engaging said tapped hole and adjustable to bear against said workpiece and thereby tighten said workpiece against said first stop means.

References Cited

UNITED STATES PATENTS 1,841,196   1/1932   Mass _____ 269—104

FOREIGN PATENTS 189,548   11/1906   Germany.

ANDREW R. JUHASZ, Primary Examiner

G. WEIDENFELD, Assistant Examiner

U.S. Cl. X.R.

90—12; 269—231